United States Patent
Jones

(10) Patent No.: US 7,509,189 B2
(45) Date of Patent: Mar. 24, 2009

(54) TURBO MACHINERY SPEED MONITOR

(75) Inventor: Ian Jones, West Mersea (GB)

(73) Assignee: ICS Triplex Technology Limited (GB)

( * ) Notice: Subject to any disclaimer, the term of this patent is extended or adjusted under 35 U.S.C. 154(b) by 293 days.

(21) Appl. No.: 11/476,334

(22) Filed: Jun. 28, 2006

(65) Prior Publication Data

US 2007/0000230 A1    Jan. 4, 2007

(30) Foreign Application Priority Data

Jul. 1, 2005    (GB)    ................................. 0513571.0

(51) Int. Cl.
G05D 11/00    (2006.01)
(52) U.S. Cl. ...................................................... 700/290
(58) Field of Classification Search ................. 700/287, 700/290, 304
See application file for complete search history.

(56) References Cited

U.S. PATENT DOCUMENTS

| | | | |
|---|---|---|---|
| 1,052,682 A * | 2/1913 | Peters et al. ................. 411/448 |
| 3,826,094 A * | 7/1974 | Conrad et al. ................. 60/686 |
| 3,859,007 A | 1/1975 | Kowalski et al. |
| 4,217,617 A * | 8/1980 | Rossi et al. ..................... 361/51 |
| 4,635,209 A * | 1/1987 | Hwang et al. ............... 700/290 |
| 5,234,315 A * | 8/1993 | Ogihara et al. ................ 415/16 |
| 6,116,258 A * | 9/2000 | Shapiro et al. ................. 137/1 |
| 6,321,525 B1 | 11/2001 | Rogers |
| 2006/0230755 A1 * | 10/2006 | Natili et al. .................... 60/468 |
| 2007/0113559 A1 * | 5/2007 | Zagranski et al. ............. 60/773 |
| 2008/0126836 A1 * | 5/2008 | DiZoglio et al. ............... 714/4 |

FOREIGN PATENT DOCUMENTS

| | | |
|---|---|---|
| EP | 1296046 | 7/2004 |
| GB | 2128376 | * 4/1984 |
| GB | 2220279 | 1/1990 |

OTHER PUBLICATIONS

Search Report for on Application GB0513571.0, Sep. 19, 2005.
European Search Report for EP 06 11 3835, Jun. 3, 2008, EPO.

* cited by examiner

*Primary Examiner*—Albert DeCady
*Assistant Examiner*—Chad Rapp
(74) *Attorney, Agent, or Firm*—Boyle Fredrickson LLP; William R. Walbrun

(57) ABSTRACT

This invention relates to a speed monitor apparatus for monitoring speed and acceleration of rotating turbine equipment (turbomachinery) and for operating an overspeed trip to shut down the equipment in the event that the speed or acceleration exceed predetermined thresholds. The invention provides a speed monitor module wherein the speed monitor module may be may be plugged in to the same chassis as a module which is controlling the speed of the turbine, and wherein the turbine speed monitor is arranged to receive configuration parameters relating to the overspeed threshold and the over-acceleration threshold only when the turbine is operating at a speed lower than a predetermined threshold.

12 Claims, 6 Drawing Sheets

TURBO MACHINERY SPEED MONITOR

BACKGROUND OF THE INVENTION

This invention relates to a speed monitor apparatus for monitoring speed and acceleration of rotating turbine equipment (turbomachinery) and for operating an overspeed trip to shut down the equipment in the event that the speed or acceleration exceed predetermined thresholds.

Turbomachinery is used in many industries including oil and gas production and refining, chemical production and processing, power generation, paper and textile mills ands sewage treatment plants.

It is desirable that turbines used in such industries have some form of overspeed protection system which will shut down the turbine in the event that a fault condition causes the turbine to rotate too quickly or for the speed of rotation to accelerate too quickly.

This invention provides improvements to known electronic overspeed protection systems.

SUMMARY OF THE INVENTION

According to the invention there is provided a turbine speed monitor module comprising: a sensor for generating a sensor signal in dependence upon rotational speed of a turbine a module arranged to receive said sensor signal and arranged in operation to generate a trip signal when detected acceleration is greater than a predetermined overacceleration threshold or when detected speed is greater than a predetermined overspeed threshold; and wherein the speed monitor module may be may be plugged in to the same chassis as a module which is controlling the speed of the turbine, and wherein the turbine speed monitor is arranged to receive configuration parameters relating to the overspeed threshold and the overacceleration threshold only when the turbine is operating at a speed lower than a predetermined threshold.

Preferably the configuration parameters further comprise an overspeed test threshold which is greater than said overspeed threshold and wherein the module is arranged to generate a trip signal only in the event that the detected speed is greater than the overspeed test threshold and wherein the overspeed test threshold is used as said predetermined overspeed threshold for a predetermined time period after which the predetermined overspeed threshold is reset to be equal to the received overspeed threshold.

In a preferred embodiment said module comprises three identical module slices and an output switch and the trip signal is generated by the output switch, the output switch being arranged to receive an output signal from each one of the module slices, and in which the output switch comprises a two out of three voter arranged to receive a signal from each slice and generate a trip signal therefrom.

Yet more preferably said module is arranged to generate a plurality of trip signals and said output switch comprises a plurality of two out of three voters each arranged to receive a signal from each module slice and generate a trip signal therefrom.

In a preferred embodiment each module slice comprises: an input conditioner arranged to receive an analogue sensor signal and to generate a digital signal therefrom; a trip controller arranged to receive said digital signal and to generate an overspeed or overacceleration signal therefrom; and an output controller arranged to receive said overspeed or overacceleration signal and to generate said output signal therefrom.

Preferably, each module slice comprises three input conditioners connected to three trip controllers and the output controller is arranged to receive an overspeed or an overacceleration trip signal from each one of said trip controllers, and in which said output signal is generated according to a two out of three voting arrangement.

In a preferred embodiment, a further output controller arranged to receive an overspeed or an overacceleration trip signal from each trip controller, and arranged to generate a further output signal according to a two out of three voting arrangement.

In this case if the output controller is arranged to receive three overspeed trip signals and generate an overspeed trip signal then the further output controller is arranged to received three overacceleration trip signals and generate an overacceleration trip signal.

BRIEF DESCRIPTION OF THE DRAWINGS

An embodiment of the invention will now be described, by way of example only, with reference to the accompanying drawings in which.

DETAILED DESCRIPTION

Figure 1:
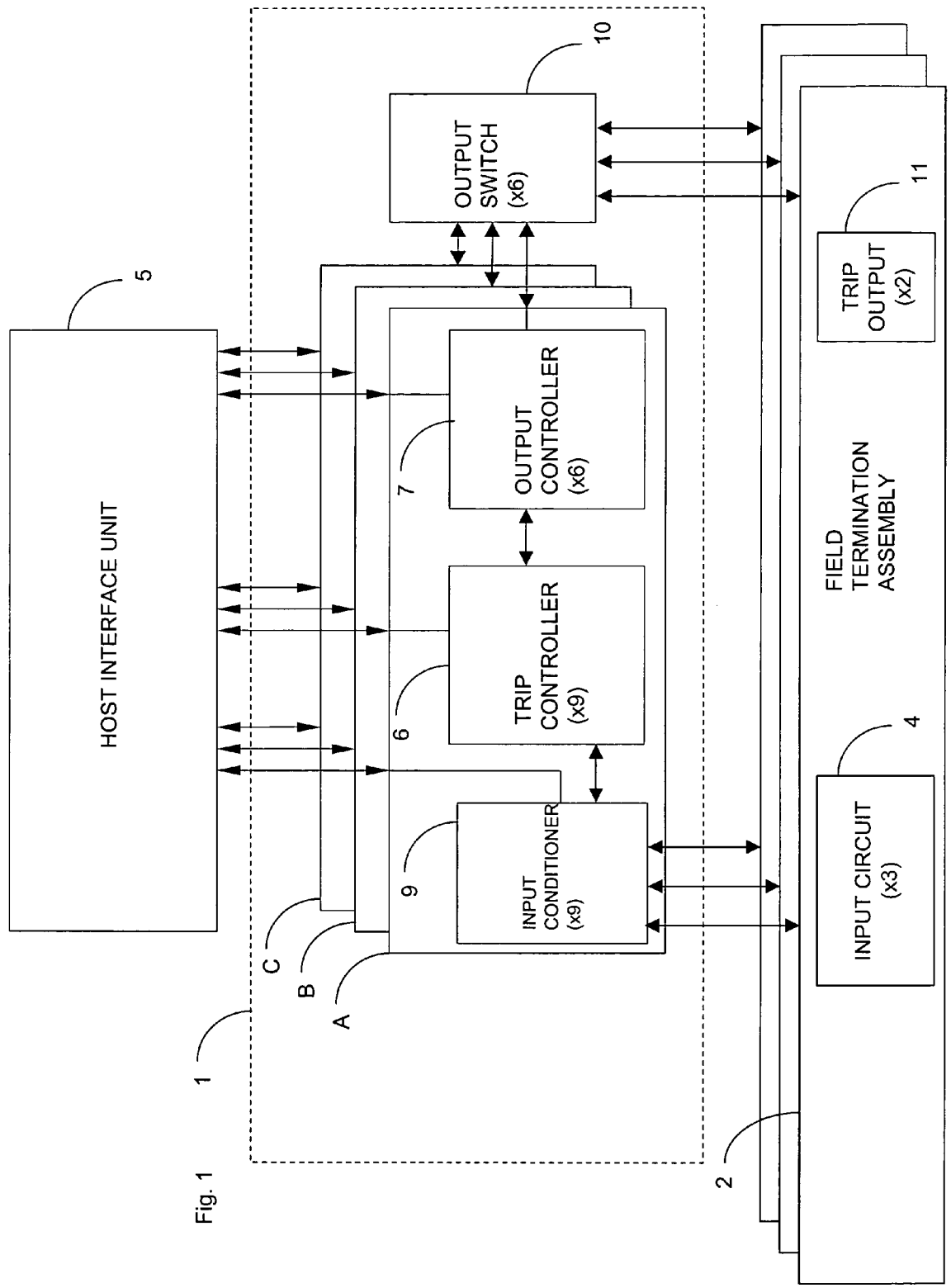
FIG. 1 is a block diagram of a speed monitor module.

Referring now to FIG. 1 a speed monitor module 1 measures the speed and acceleration of up to three turbines. The invention will be described in relation to one turbine only for reasons of simplicity. A field termination assembly 2 provide an interface between sensors in the field and the module 1.

Input circuit 4 receives signals from sensors which may be active sensors, passive sensors or a combination of active and passive sensors.

The sensor inputs are arranged as a group of three inputs associated with a single turbine. The use of three sensors provides redundancy and fault tolerance.

Every sensor input is received by each one of three replicated module slices A B and C. Each slice A, B, C has three input conditioners 9. Each slice A, B, C has three trip controllers 6 each of which analyses each of the input signals to determine the speed and acceleration measured by each sensor. Each sensor is analysed by each respective trip controller 6 to produce an 'overspeed' output trip signal and an 'overacceleration' output trip signal when the speed or acceleration is determined to have risen to greater than a respective predetermined threshold. Two output controllers 7 generate two output signals in dependence upon either the three overspeed trip signals or the three overacceleration trip signals. Each output signal may be driven by analysis of one, two or all three sensor inputs from the group as determined a trip controllers 6. The two output signals from each slice are then used to produce four overspeed and overacceleration outputs for each group of sensors by one of two output switches 10 using a two out of three voting system which is replicated four times. The four overspeed and overacceleration outputs for each group are then used to drive a pair of trip output modules 11 in one of three field termination assemblies 2.

A host interface unit 5 interfaces to each one of the input conditioners 9, to each one of the trip controllers 6 and to each one of the output controllers 7 to provide configuration data, test and diagnostic signals, and to receive diagnostic data. The HIU 5 provides information to all three slices and also caters for signal routing between the various modules on each slice.

The Host Interface Unit provides software functionality for a slice. The HIU is also triplicated to provide fault tolerance.

Figure 2:
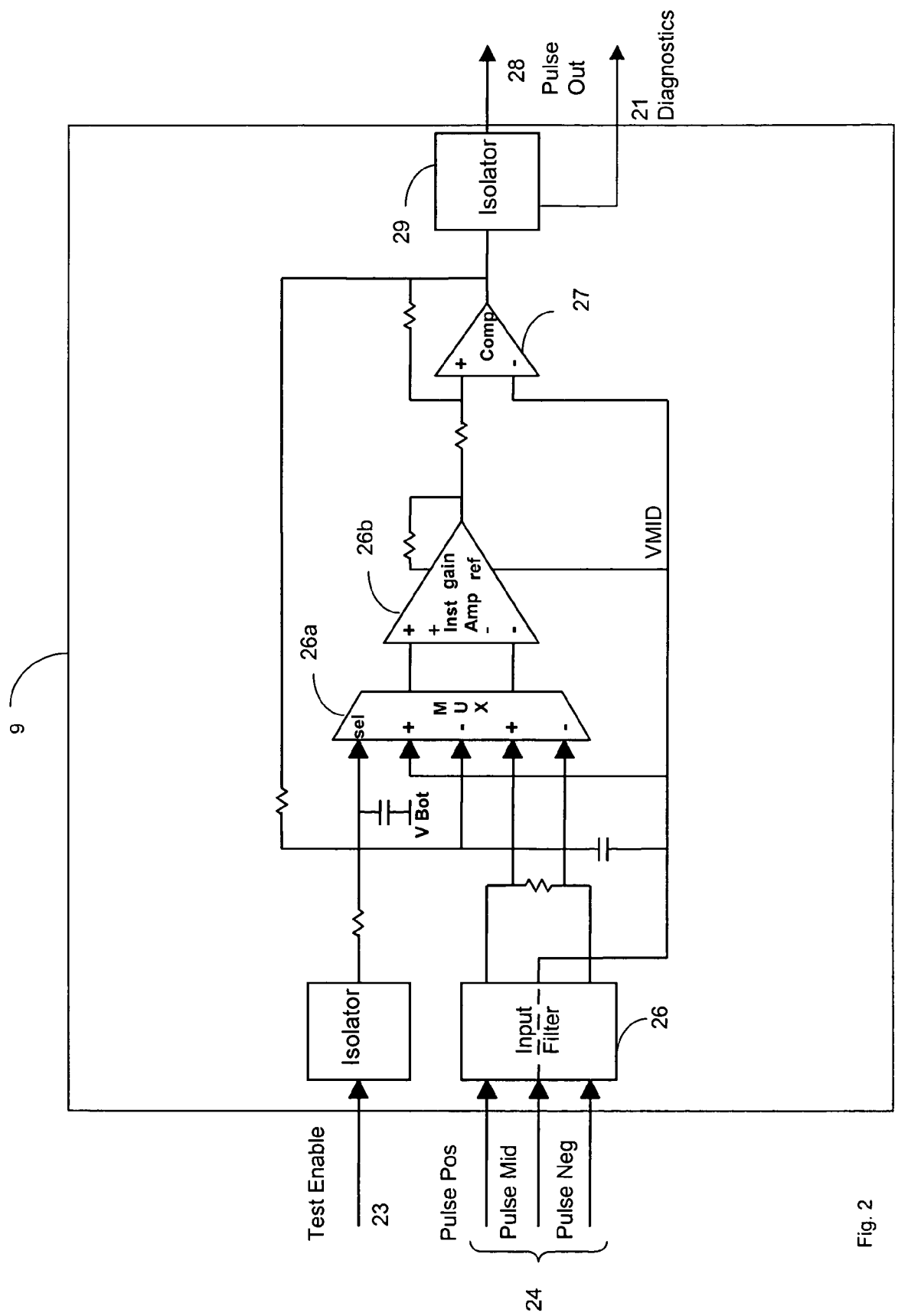
FIG. 2 illustrates an input conditioner.

FIG. 2 illustrates the input conditioner 9. The input conditioner 9 receives analogue sensor signals from the field termination assembly 2. The passive sensor provides a differential signal 24, which passes via filter 26, through multiplexer 26a and amplified by an amplifier 26b and then compared to a threshold by a comparator 27. The output is a data signal 28 comprising a digital pulse train of the same frequency as the differential input signals 24. The output data signal 28 is isolated by a galvanic isolator 29.

A test input 23 is provided from the host interface unit 5 via a galvanic isolator 25. The test signal can be used to causes multiplexer 26a to select as an input the output from the comparator 27 via a feedback connection 29. This causes the amplifier 26b to oscillate and provides a method of testing the input circuitry 9.

Figure 3:
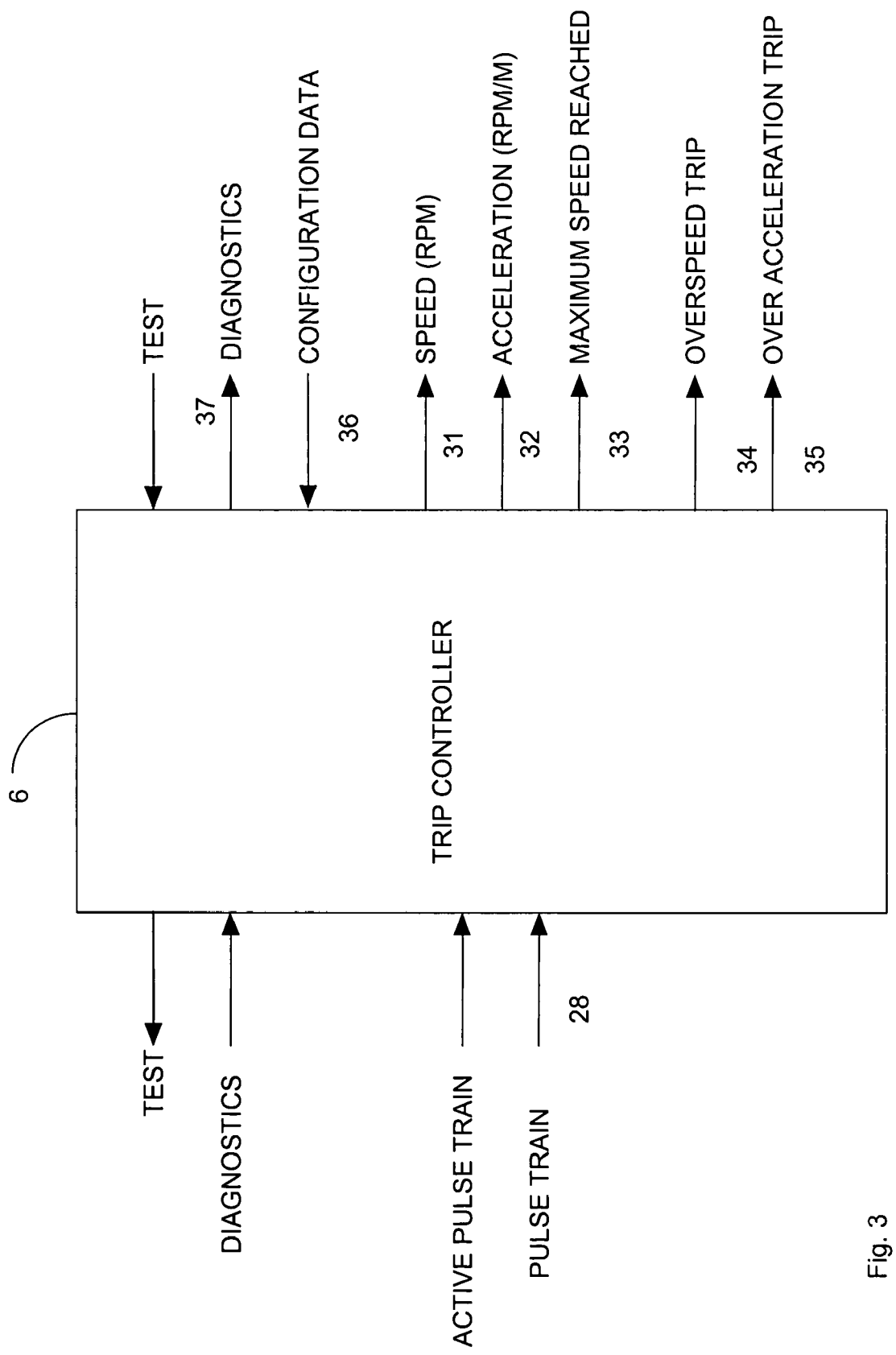
FIG. 3 illustrates a trip controller.

FIG. 3 illustrates a trip controller 6 on a slice A, B or C. The trip controller 6 receives configuration data 36 from the host interface unit 5. The configuration data comprises:

Number of gear teeth, from 1 to 1000.
Over speed trip mode, latching or non-latching
Over acceleration trip mode, latching or non-latching.
Overspeed trip sense.
Overacceleration trip sense.
Overspeed trip threshold in RPM.
Overspeed test trip threshold in RPM.
Overspeed test timeout.
Overacceleration trip threshold in RPM/M.
Overspeed trip dead-band.
Overacceleration trip dead-band.

The overspeed trip sense and overacceleration trip sense are binary values which are used by diagnostics to determine whether there is a current through trip relays in the trip output module in response to detection of an overspeed or overacceleration condition. The overspeed and overacceleration dead-bands define when a detected overspeed or overacceleration will revert to a non-tripped condition. The deadbands may be defined as a percentage of the trip thresholds or as an absolute value, and provide hysteresis in the system. However, when a latching mode is selected the trip remains once an overspeed or overacceleration trip is detected even if the condition is transient.

Data signal 28 is received from input signal conditioner 9. The trip controller uses the data signal 28 and the number of gear teeth to calculate the turbine speed in revolutions per minute (RPM) in this embodiment of the invention the speed is determined to within 0.5 RPM to determine a speed output signal 31. The acceleration is also calculated in RPM per minute (RPM/M) to determine an acceleration output signal 32. The maximum speed reached is also determined, by comparing the present speed to a stored maximum speed and replacing the stored maximum speed with the present speed if the stored maximum speed has been exceeded. A signal 33 representing the maximum speed reached is also provided to the HIU where they may be used by other control functions or displayed to the user.

There are two overspeed thresholds; the overspeed trip threshold and the overspeed test trip threshold. A binary test input 37 determines which trip threshold is selected to determine the state of a binary overspeed trip output 34.

The determined speed is compared to the selected trip threshold. If the speed exceeds the selected trip threshold, then the overspeed trip output 34 will be set or cleared depending on the overspeed trip sense configured by the host interface unit 5.

In general the overspeed trip threshold is used. However there are circumstances where it is desirable to allow the turbine to exceed this threshold without causing the speed monitor module to detect an overspeed condition and shut down the turbine. As well as having an electronic overspeed protection system a turbine may also have a mechanical overspeed protection system which will shut down the turbine at a higher speed than the electronic overspeed protection system. In order to test the mechanical overspeed protection system it is necessary to use a higher trip threshold in the electronic speed protection system so that the mechanical protection system is allowed to operate.

In the event that the speed rises to greater than the overspeed test trip the overspeed trip output is set. In the event that the time allowed by the overspeed test timeout expires the threshold is reset to be equal to the original overspeed trip threshold.

The determined acceleration is compared to the overacceleration trip threshold. If the determined acceleration exceeds the overacceleration trip threshold, then an overacceleration trip output 35 is set.

The test and diagnostic signals are provided from and to the HIU 5. In the event that any errors are detected the trip controller 6 can be put into a fail safe condition or alternatively and alarm can be raised.

The speed monitor module may be plugged in to the same chassis as a module which is controlling the speed of the turbine. However, it is important that the speed controller cannot interfere with the speed monitor in anyway because most overspeed conditions are caused by a fault in the speed controller and it is important that a fault in the speed controller does not cause the speed monitor to fail.

In order that the trip threshold can not be altered by a main processor which controls both the speed controller and the speed monitor, during use the configuration data may only be loaded when the turbine speed is less than a particular threshold (usually stopped). Furthermore when the overspeed test trip threshold is used it is controlled by a timeout so that the monitor module does not remain in this condition.

These features allow the speed monitor module to operate independently of the turbine speed control system so that in the event that the turbine speed control system fails it cannot alter any parameters used by the speed monitor module and the speed monitor module can still shut the turbine down reliably.

Figure 4:
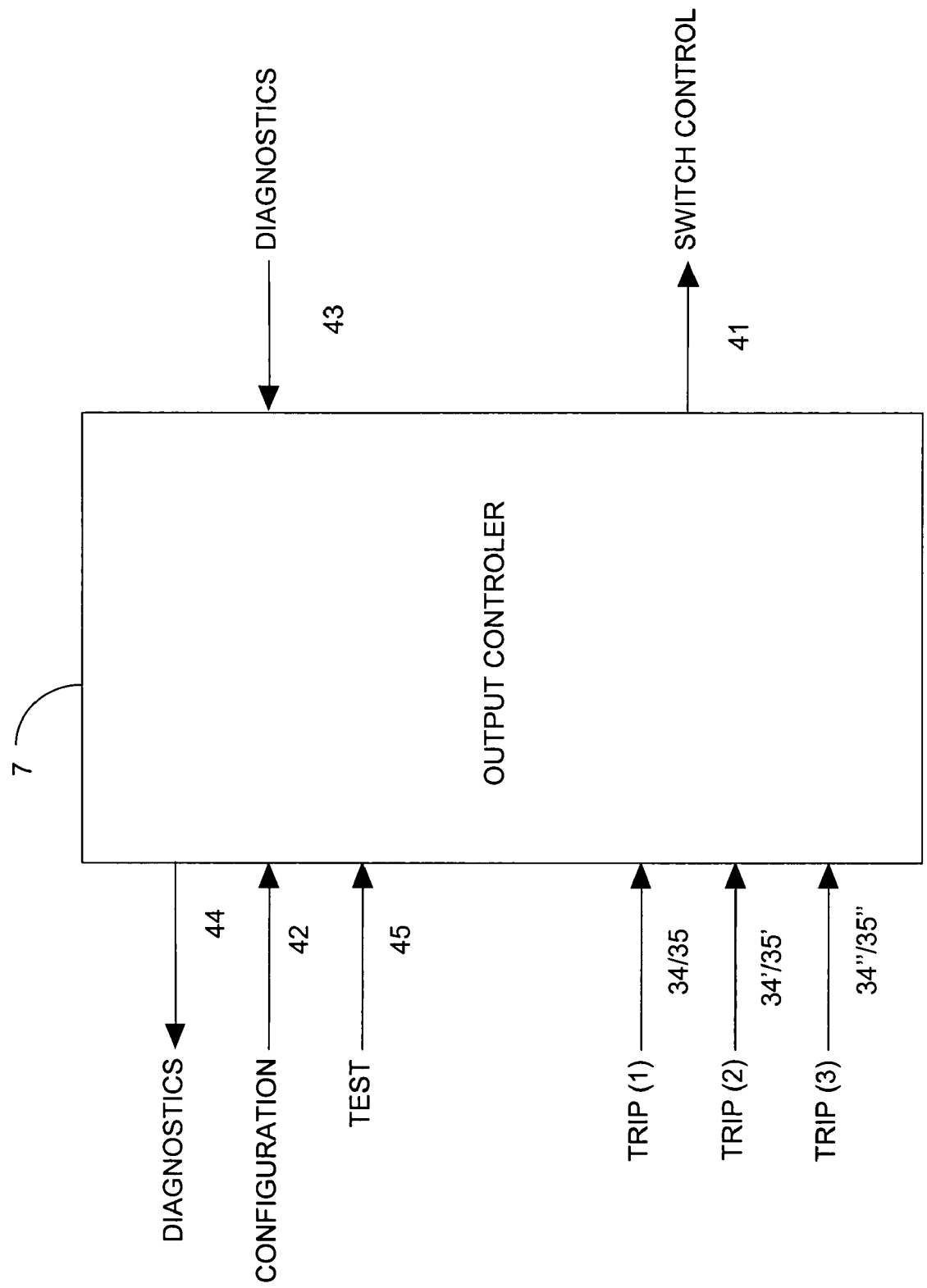
FIG. 4 illustrates an output controller.

FIG. 4 illustrates an output controller 7 on a slice A, B or C.

The output controller 7 receives three signals from three trip controllers via the HIU 5. Either three overspeed trip outputs 34, 34', 34" or three overacceleration trip outputs 35, 35', 35" are received. The three trip outputs are arranged to relate to the analysed data from three sensors from a group. Configuration data received from the host interface unit determines which trip outputs are received by the output controller 7, and which of the three received trip outputs are used to generate a switch control output 41.

Diagnostic data 43 may be received from the output switch 10 and diagnostic data may be provided to the HIU 5, relating to the status of the output controller 7 and to the output switch 10.

Test input and override signals 45, are provided by the HIU 5 for allowing testing of the output controller 7. In particular a trip may be forced.

Figure 5:
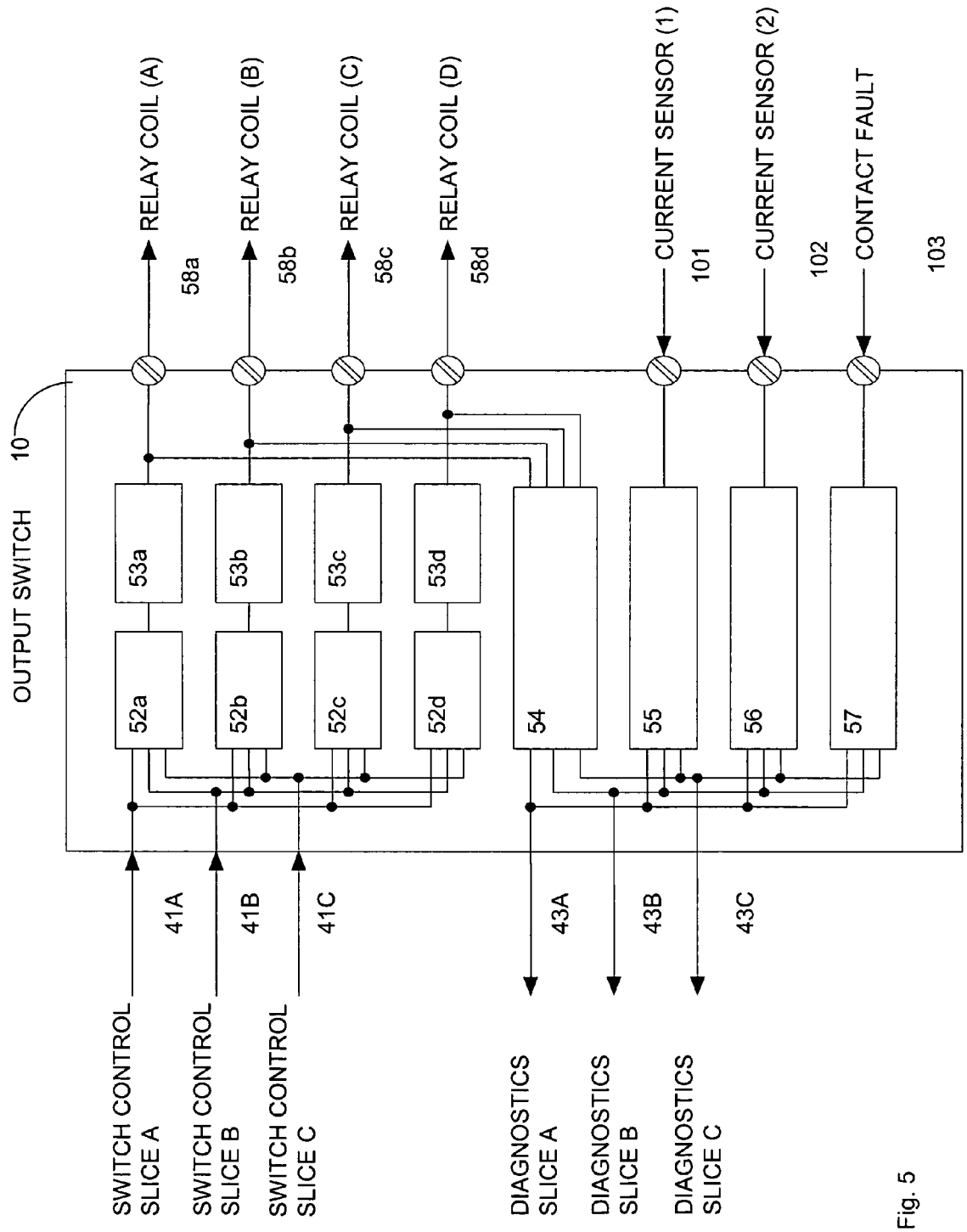
FIG. 5 illustrates an output switch.

FIG. 5 illustrates an output switch 10 which is used to drive the trip output module 11 on the field termination assembly 2.

Each output switch 10 accepts three inputs 41A, 41B, 41C (corresponding to a signal from each slice A, B and C from corresponding output controllers 7, the signal being a switch control signal 41 relating to overspeed or overacceleration from a particular group of sensors). The voting circuitry in the output switch 10 is replicated four times as four separate circuits to provide four outputs which are used to drive relays in the trip output module 11.

The output switch 10 has diagnostic output signals 43A, 43B, 43C which are connected to the diagnostic input port on said corresponding output controllers 7.

The diagnostic information includes relay drive status, relay contact status and current in each leg of the output relay structure of the trip output module 11. The diagnostic information relating to relay contact status and current in each leg of the output relay structure is received via diagnostic input signals 101, 102, 103 from the trip output module 11 and sent via monitors 55, 56, 57 to the relevant output controllers on each slice A, B, C.

The output switch 10 has four 'two out of three' voters 52a, 52b, 52c, 52d which are connected to all three inputs 41A, 41B, 41C. The result of the two out of three vote is made available via relay drivers 53a, 53b, 53c, 53d, as corresponding signals 58a, 58b, 58c, 58d to the trip output module 11.

The signals 58a, 58b, 58c, 58d are also sent via a relay drive status block 54 to the relevant output controllers 7 on each slice A, B, C for diagnostic purposes.

Each field termination assembly 2 may be considered to comprise an input field termination assembly and an output field termination assembly. The input field termination assembly comprises three input circuits 4.

These inputs 4 contain surge suppression and filtering components necessary to protect module circuits against high voltage transients and faults. Pulses that arrive from the sensors can vary in amplitude from several hundred millivolts to over 100 volts. A termination resistor in the input circuit 4 reduces the amplitude to a maximum of about 10 volts.

The field termination assembly 2 may also serve as a distribution point for supplying power to any active sensors in the field.

The output field termination assembly comprises two trip output circuits 11.

Figure 6:
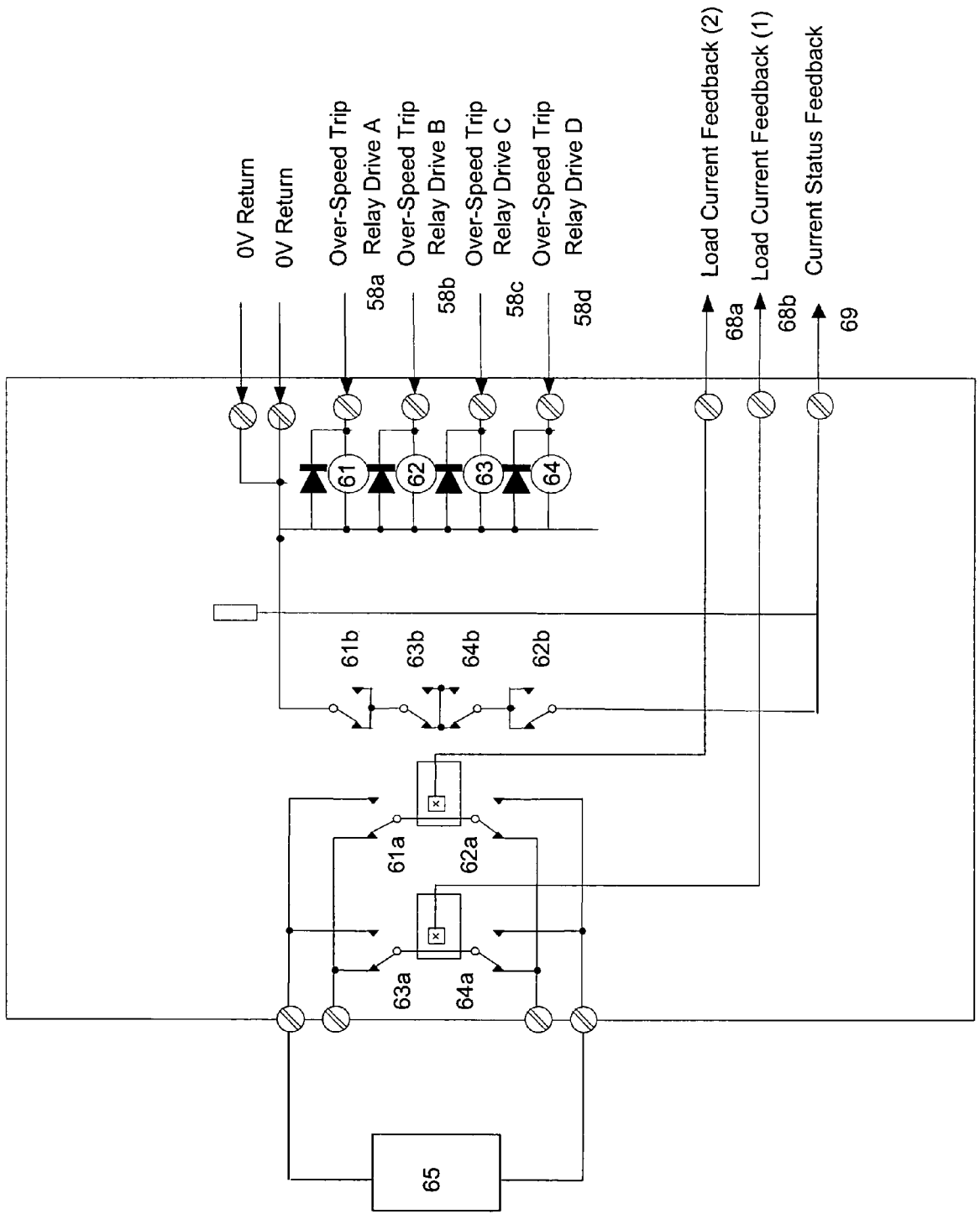
FIG. 6 illustrates a trip output.

FIG. 6 illustrates a trip output circuit 11. The overspeed trip circuit and the over acceleration circuit are identical to one another and are implemented on by single trip output circuit. For simplicity only a single trip circuit is illustrated.

Clamped armature relays are labelled as follows: a reference numeral 61,62,63,64 indicates a relay driver and reference numerals 61a,61b etc indicate a pair of clamped armatures. One of he clamped armatures eg 61a is energised or de-energised and the other eg 61b moves simultaneously. This means that if one of the pair of clamped armatures 61a, 61b becomes stuck in one position the armature of the relay to which it is clamped will 'float' between contacts, allowing a fault to be detected.

Referring still to FIG. 6, a trip output circuit is arranged so that a single relay failure or faulty input will not cause a failure.

The relays are arranged such that they are normally energised and are de-energised to trip. Signals 58a, 58b, 58c, 58d are used to drive each armature clamped relay 61, 62, 63, 64. A first armature of each pair 61a, 62a, 63a, 64a forms two parallel electrical paths which are connected via a load 65 when the relays 61, 62, 63, 64 are energised. In the event of an overspeed condition, if any one of the relay contacts fails to open there will still be an electrical break allowing the overspeed trip to function. Two Hall effect sensors 66a, 66b detect whether there is current flowing in both parallel paths and if only one is active then this is detected via feedback signals 68a, 68b.

Such an error could be caused either by a failure of one of the relays 61a, 62a, 63a, 64a, or by an error in one of the input signals 58a, 58b, 58c, 58d.

In order to determine the likely cause, the second armature of each pair 61b, 62b, 63b, 64b are connected to form an electrical path which is continuous as long as each one of the armatures 61b, 62b, 63b, 64b is in an open or a closed configuration. Only in the event that an armature 61b, 62b, 63b, 64b is floating between an open and a closed position will the electrical path be discontinuous. This will happen when one of the armatures 61a, 62a, 63a, 64a, has become stuck. Therefore feedback signal 69 may be used, in conjunction with signals 68a and 68b to determine whether a fault is due to a fault in the output relays or due to a faulty input signal. The signals 68a and 68b are used to check than there is current in both paths when a fault is detected.

A single signal 69 may be used to indicate a 'stuck' fault on any number of clamped armature pair relays, and may be used to indicate a fault relating to a fault in either an overspeed trip output circuit or an overacceleration trip output circuit.

It will be appreciated that various alterations, modifications, and/or additions may be introduced into the constructions and arrangements of parts described above without departing from the scope of the present invention as defined in the following claims.

The invention claimed is:

1. A turbine speed monitor module comprising:
   a sensor for generating a sensor signal in dependence upon rotational speed of a turbine;
   a speed monitor module arranged to receive said sensor signal and arranged in operation to generate a trip signal when detected acceleration is greater than a predetermined overacceleration threshold or when detected speed is greater than a predetermined overspeed threshold; and
   wherein the speed monitor module is adapted to be plugged in to a same chassis as a module which is controlling the speed of the turbine, and wherein the turbine speed monitor is arranged to receive and accept changes to configuration parameters relating to the overspeed threshold and the overacceleration threshold only when the turbine is operating at a speed lower than a predetermined threshold.

2. A turbine speed monitor module according to claim 1, in which said module comprises three identical module slices and an output switch and the trip signal is generated by the output switch, the output switch being arranged to receive an output signal from each one of the module slices, and in which the output switch comprises a two out of three voter arranged to receive a signal from each slice and generate a trip signal therefrom.

3. A turbine speed monitor module according to claim 2, in which said module is arranged to generate a plurality of trip signals and said output switch comprises a plurality of two out of three voters each arranged to receive a signal from each module slice and generate a trip signal therefrom.

4. A turbine monitor module according to claim 2, in which each module slice comprises:
   an input conditioner arranged to receive an analogue sensor signal and to generate a digital signal therefrom;
   a trip controller arranged to receive said digital signal and to generate an overspeed or overacceleration signal therefrom; and an output controller arranged to receive said overspeed or overacceleration signal and to generate said output signal therefrom.

5. A turbine monitor module according to claim 4, wherein each module slice comprises three input conditioners connected to three trip controllers and the output controller is arranged to receive an overspeed or an overacceleration trip signal from each one of said trip controllers, and in which said output signal is generated according to a two out of three voting arrangement.

6. A turbine monitor module according to claim 5, further comprising a further output controller arranged to receive an overspeed or an overacceleration trip signal from each trip controller, and arranged to generate a further output signal according to a two out of three voting arrangement.

7. A turbine speed monitor module comprising:
   a sensor for generating a sensor signal in dependence upon rotational speed of a turbine;
   a speed monitor module arranged to receive said sensor signal and arranged in operation to generate a trip signal when detected acceleration is greater than a predetermined overacceleration threshold or when detected speed is greater than a predetermined overspeed threshold;
   wherein the speed monitor module is adapted to be plugged in to a same chassis as a module which is controlling the speed of the turbine, and wherein the turbine speed monitor is arranged to receive configuration parameters relating to the overspeed threshold and the overacceleration threshold only when the turbine is operating at a speed lower than a predetermined threshold; and in which the configuration parameters further comprise an overspeed test threshold which is greater than said overspeed threshold and wherein the module is arranged to generate a trip signal only in an event that the detected speed is greater than the overspeed test threshold and wherein the overspeed test threshold is used as said predetermined overspeed threshold for a predetermined time period after which the predetermined overspeed threshold is reset to be equal to the received overspeed threshold.

8. A turbine speed monitor module according to claim 7, in which said module comprises three identical module slices and an output switch and the trip signal is generated by the output switch, the output switch being arranged to receive an output signal from each one of the module slices, and in which the output switch comprises a two out of three voter arranged to receive a signal from each slice and generate a trip signal therefrom.

9. A turbine speed monitor module according to claim 8, in which said module is arranged to generate a plurality of trip signals and said output switch comprises a plurality of two out of three voters each arranged to receive a signal from each module slice and generate a trip signal therefrom.

10. A turbine monitor module according to claim 8, in which each module slice comprises:
   an input conditioner arranged to receive an analogue sensor signal and to generate a digital signal therefrom;
   a trip controller arranged to receive said digital signal and to generate an overspeed or overacceleration signal therefrom; and
   an output controller arranged to receive said overspeed or overacceleration signal and to generate said output signal therefrom.

11. A turbine monitor module according to claim 10, wherein each module slice comprises three input conditioners connected to three trip controllers and the output controller is arranged to receive an overspeed or an overacceleration trip signal from each one of said trip controllers, and in which said output signal is generated according to a two out of three voting arrangement.

12. A turbine monitor module according to claim 11, further comprising a further output controller arranged to receive an overspeed or an overacceleration trip signal from each trip controller, and arranged to generate a further output signal according to a two out of three voting arrangement.

* * * * *